Sept. 27, 1938.   W. W. SLOANE   2,131,456
KERF CUTTING MACHINE
Original Filed June 5, 1936   4 Sheets-Sheet 1
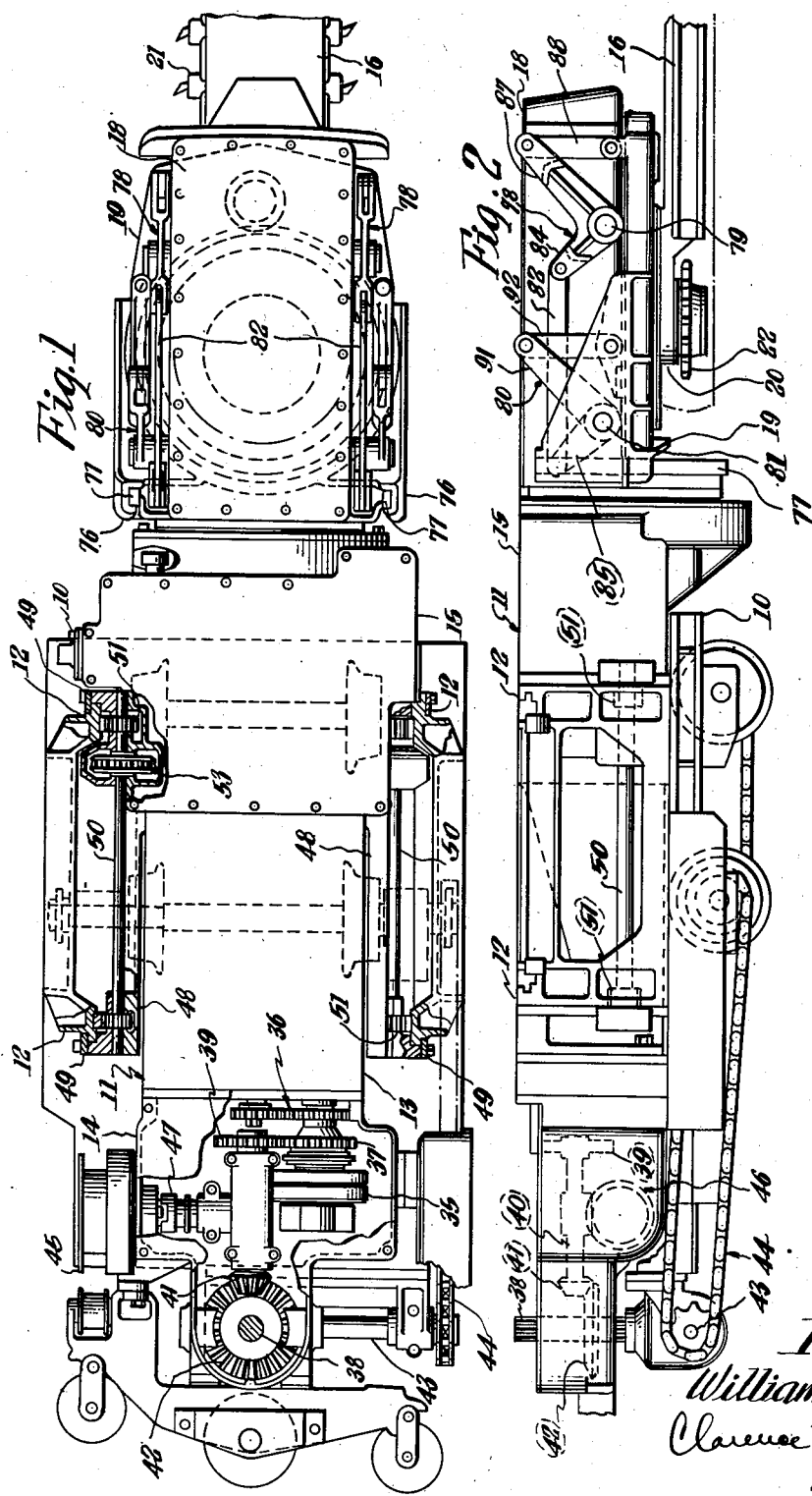
Inventor
William W. Sloane
Clarence F. Poole
Attorney Sept. 27, 1938.  W. W. SLOANE  2,131,456
KERF CUTTING MACHINE
Original Filed June 5, 1936   4 Sheets-Sheet 2
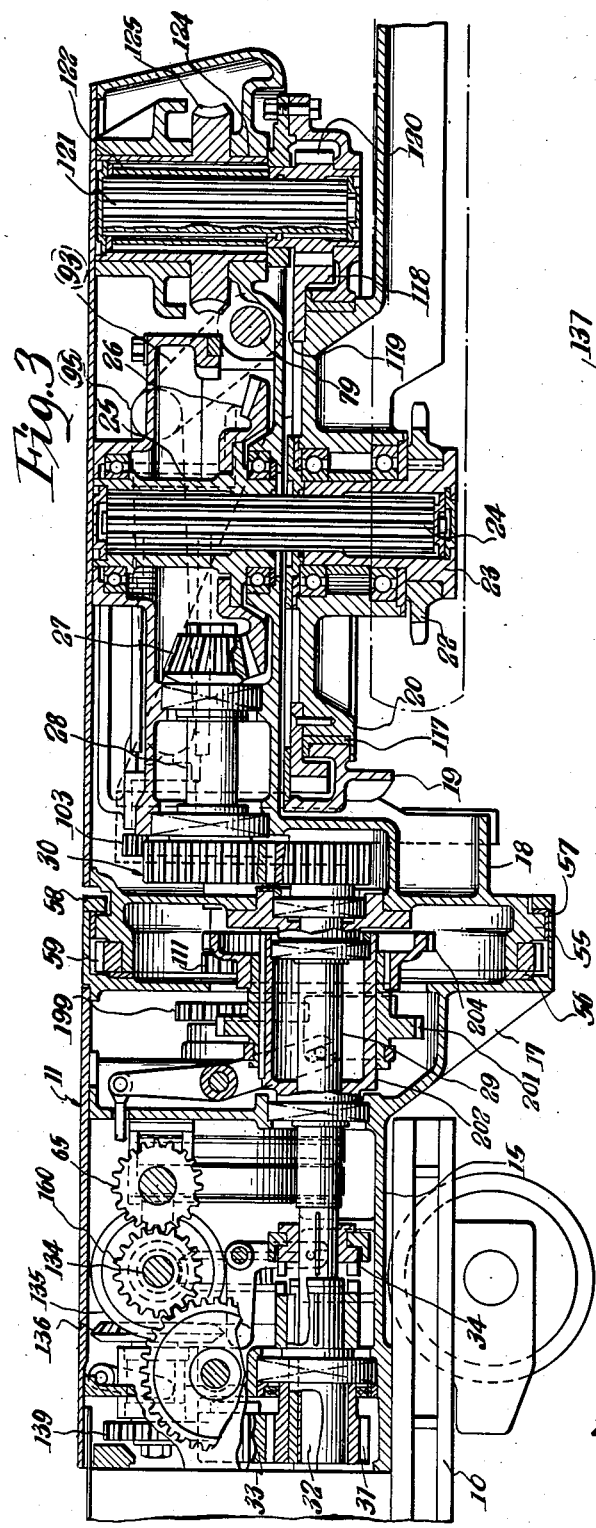
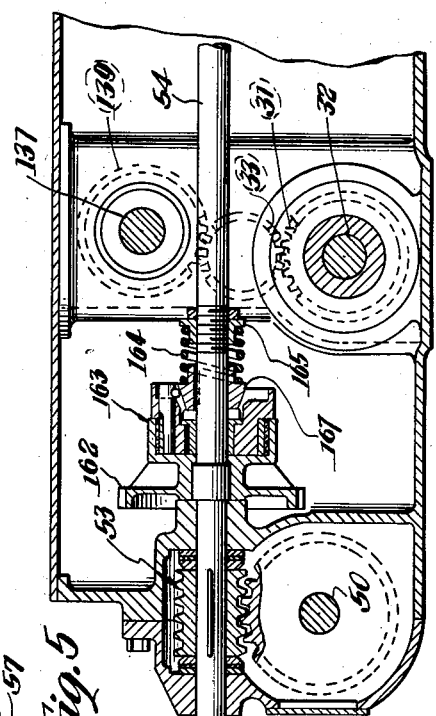
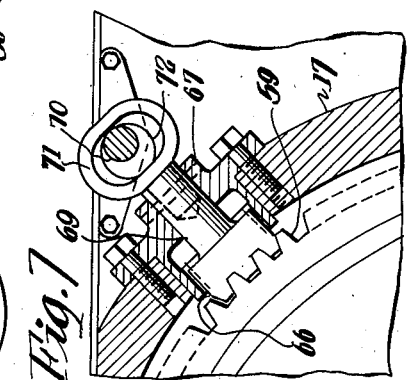
Inventor
William W. Sloane
Clarence F. Poole
Attorney

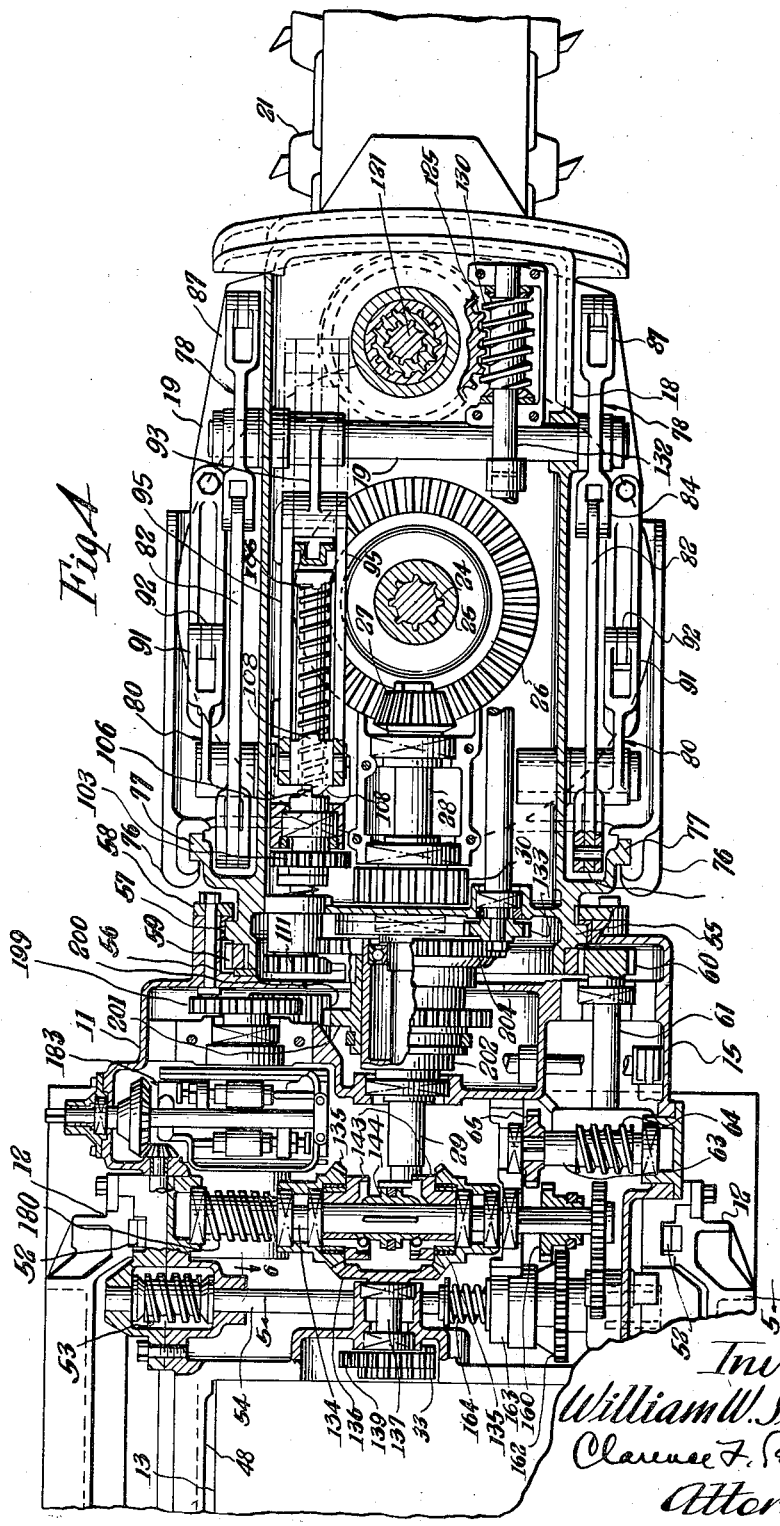

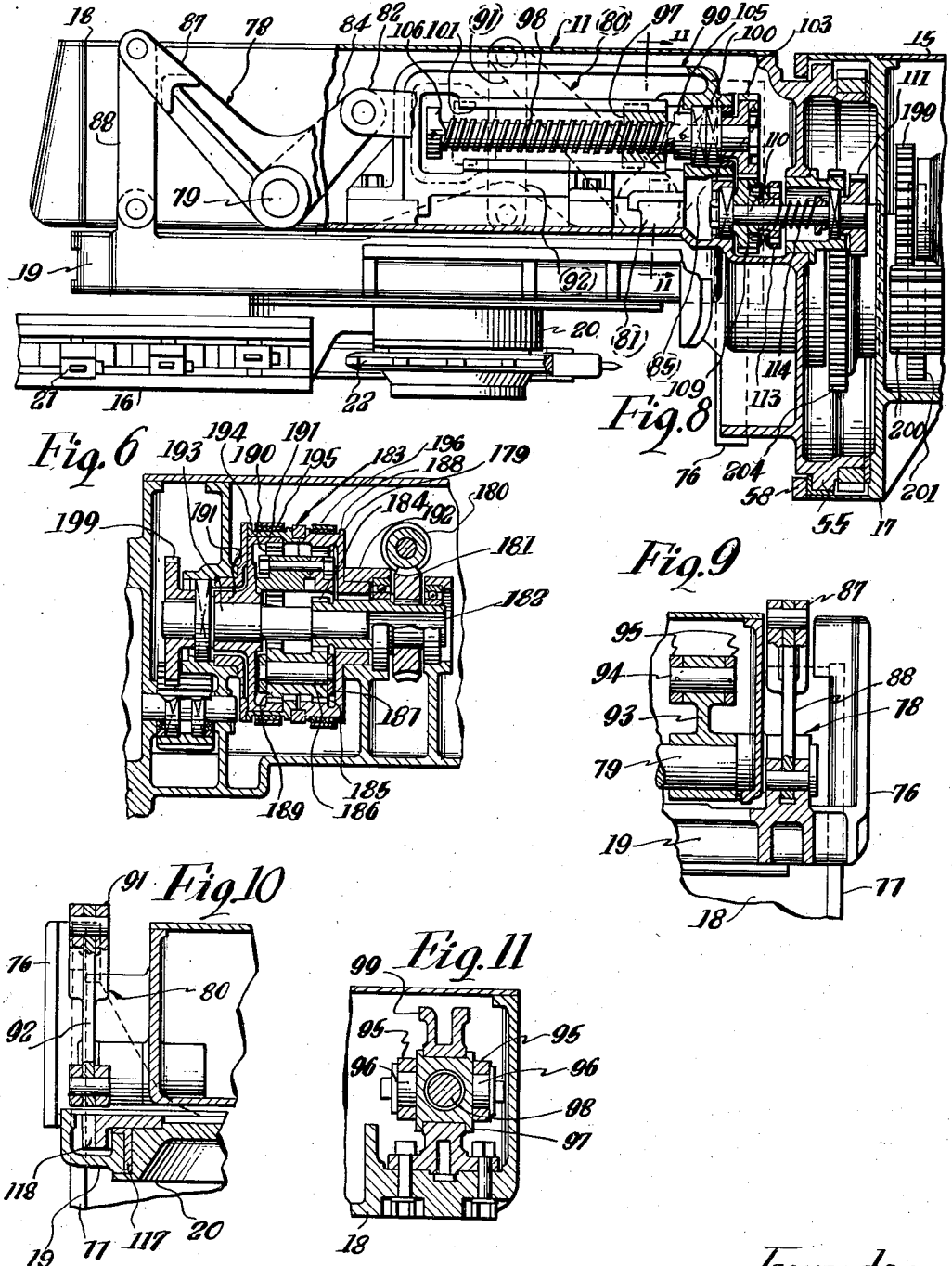

Patented Sept. 27, 1938

2,131,456

UNITED STATES PATENT OFFICE 2,131,456

KERF-CUTTING MACHINE

William W. Sloane, Chicago, Ill., assignor to Goodman Manufacturing Company, Chicago, Ill., a corporation of Illinois Original application June 5, 1936, Serial No. 83,733. Divided and this application December 18, 1936, Serial No. 116,478. Renewed February 28, 1938

19 Claims. (Cl. 262—28)

This invention relates to improvements in kerf-cutting machines of the track-mounted type adapted for use in restricted places for cutting horizontal kerfs at various positions from the mine roof to the mine floor, or shearing kerfs at either side of the machine.

Among the objects of my invention are to provide a machine of the class described constructed in a novel manner so as to be of a simple and rugged construction suitable for use in mines wherein the radius of curvature of the track is relatively short.

Another object of my invention is to provide a novel form of drive, wherein all of the cutting, feeding and positioning operations are driven from a single motor, which includes a novel arrangement of power driven gearing for positioning the cutter bar to cut shearing or horizontal kerfs or kerfs disposed at various angles with respect to the coal face if desired.

Other objects of my invention will appear from time to time as the following specification proceeds.

This application is a division of an application Serial Number 83,733, filed June 5, 1936, which issued as Patent No. 2,118,529 on May 24, 1938.

My invention may be more clearly understood with reference to the accompanying drawings wherein:

Figure 1 is a top plan view of a mining machine constructed in accordance with my invention with certain parts broken away and shown in section;

Figure 2 is a side elevation of the device shown in Figure 1;

Figure 3 is a fragmentary longitudinal sectional view of the forward portion of the machine shown in Figure 1, drawn to an enlarged scale;

Figure 4 is a fragmentary plan view of the forward portion of the machine shown in Figure 1 drawn to an enlarged scale, with the gear covers removed and certain parts broken away and shown in horizontal section in order to more clearly illustrate certain details of my invention;

Figure 5 is an enlarged fragmentary sectional view taken substantially along line 5—5 of Figure 4;

Figure 6 is an enlarged fragmentary sectional view taken substantially along line 6—6 of Figure 4;

Figure 7 is an enlarged detail view with parts shown in vertical section, showing certain details of the mechanism for locking the cutter bar in position to cut in various angular positions with respect to the coal face;

Figure 8 is a detail view of the forward portion of the machine drawn to substantially the same scale as Figure 3, but showing the opposite side of the machine from Figure 3, and showing certain parts broken away and in longitudinal section not shown in Figure 3;

Figure 9 is a detail partial fragmentary vertical sectional view showing certain details of the cutter bar adjusting mechanism;

Figure 10 is a detail partial fragmentary vertical sectional view showing certain other details of the cutter bar adjusting mechanism not shown in Figure 9; and Figure 11 is a detail partial fragmentary sectional view taken substantially along line 11—11 of Figure 8, showing certain details of the cutter bar adjusting mechanism not shown in Figures 9 and 10.

In the drawings the embodiment of my invention illustrated includes a track mounted truck 10 having a cutting element 11 mounted thereon for vertical adjustment with respect thereto in a pair of parallel-spaced guides 12, 12.

The cutting element 11 includes generally a motor 13 having truck driving mechanism disposed rearwardly thereof and housed in and supported by a support frame 14 extending rearwardly from said motor, and having cutting mechanism disposed forwardly of said motor. Said cutting mechanism includes a projecting cutter bar 16 supported by a support frame 15 secured to and projecting from the forward end of said motor.

The cutting mechanism support frame 15 has a projecting forward end 17, a portion of which end depends from said truck and forms a longitudinal pivotal bearing support for a turning frame 18 which projects forwardly from said forward end. Said turning frame has a support frame 19 mounted for rectilinear movement with respect thereto in a plurality of parallel planes in a manner which will hereinafter more clearly appear as this specification proceeds.

A cutter frame 20, which forms a support member for the cutter bar 16, is pivotally mounted in the support frame 19 for pivotal movement about an axis perpendicular to the longitudinal axis of the machine. Said cutter bar has a cutter chain 21 movable thereabout in a closed orbital path which meshes with a sprocket 22 mounted on a sleeve 23 journaled in said cutter frame coaxial with the pivotal axis thereof in suitable ball bearings. (See Figure 3.)

The cutter chain 21 is driven from the forward end of the motor 13 through a suitable extensible drive connection which includes a splined shaft 24 slidably engaging an internal splined bore of the sleeve 23, and an internally splined hub 25 of a bevel gear 26. Said bevel gear is driven from a bevel pinion 27 on the forward end of a longitudinally extending shaft 28. Said shaft is driven from a longitudinally extending shaft 29 coaxial with the axis of the turning frame 18, by means of a gear train, generally indicated by reference character 30. The drive from the motor to said last-mentioned shaft includes a spur gear 31 on a shaft 32 aligned with the shaft 29, which meshes with a pinion 33 on the forward end of the shaft for the motor 13. Clutch mechanism, generally indicated by reference character 34, is provided for selectively connecting said shafts together. Said clutch mechanism is not herein described in detail since it is no portion of my present invention.

The mechanism for driving the truck and propelling the mining machine is similar to that shown in Patent No. 1,984,487, which issued to Frank A. Lindgren, December 18, 1934, so will only herein be described insofar as is necessary to make my present invention clearly understandable, and includes a planetary gear reduction device, generally indicated by reference character 35, which is driven from the rearward end of the motor by means of a gear train, generally indicated by reference character 36. Said planetary is not herein shown or described in detail since it is no part of my present invention. A spur gear 37 mounted coaxial with the planetary 35 is adapted to be driven therefrom at either a high or low frictionally controlled speed. Said spur gear drives a vertical splined shaft 38 by means of a spur gear 39, a shaft 40, a bevel pinion 41 and a bevel gear 42. Said splined shaft is mounted for slidable movement with respect to said bevel gear to permit the truck to be driven when the cutting element is in various positions of adjustment with respect thereto and drives a transverse shaft 43 on the truck frame through a suitable gear train of an ordinary construction (not shown). The truck is driven from said last-named shaft by means of a chain and sprocket drive, generally indicated by reference character 44.

A winding drum 45 is provided to aid in propelling the machine up grades, and to aid in feeding the cutter bar into the coal, or along the coal face where the tractive effort of the track wheels is not sufficient. Said winding drum is selectively driven from the shaft 40 by means of a worm and worm gear train 46 and suitable clutch mechanism, generally indicated by reference character 47. (See Figures 1 and 2.)

The cutting mechanism support frame 15 secured to the forward end of the motor has parallel-spaced integrally formed rearwardly projecting side members 48, 48, which extend along the sides of the motor 13. Said side members are provided with spaced-apart vertically extending shouldered portions adjacent the forward and rearward ends thereof which engage the ends and inner sides of the guides 12, 12. (See Figure 1.) Said frame is held in engagement with said guides by means of retaining strips 49, 49 secured to said side members adjacent the shouldered portions thereof and abutting shouldered outer sides of said guides as is best shown in Figures 1 and 4.

Parallel-spaced shafts 50, 50 are journaled adjacent their ends in the side members 48, 48 of the cutting mechanism support frame 15. Each of said shafts has a pair of spaced pinions 51, 51 mounted thereon adjacent opposite ends thereof which mesh with vertically disposed racks 52, 52 mounted on the inner faces of the guides 12, 12. The shafts 50, 50 are each simultaneously driven from a shaft 54 mounted in the frame 15 and disposed transversely thereof, by means of separate worm and worm gear drives, indicated by reference characters 53, 53. (See Figures 1, 4 and 5.) Said last-named shaft is selectively driven from the forward end of the motor 13 in a manner which will hereinafter be more fully described as this specification proceeds.

The turning frame 18 is mounted on the frame 15 for movement about a longitudinally extending axis by means of a rearwardly disposed annularly shouldered portion 55 formed integral with said turning frame. Said annular shouldered portion is journaled within a cylindrical inner periphery of the forward end 17 of the cutting mechanism support frame 15. The rear end of said annular shouldered portion abuts an annular bearing member 56, and a forward shouldered portion thereof is journaled in a shouldered bearing member 57. An annular ring 58 is secured to the forward end of the portion 17 and abuts the shouldered bearing 57 for retaining said bearing and the frame 15 in position.

A spur ring gear 59 is mounted on the rear end of the annular shouldered portion 55 and abuts the annular bearing 56. Said ring gear is driven from a spur pinion 60 (see Figure 4) for turning said turning frame, which pinion is on the forward end of a longitudinally extending shaft 61. Said shaft is journaled in the cutting mechanism support frame 15 in a suitable manner and is driven from a transversely extending shaft 63 by means of a suitable worm and worm gear drive, generally indicated by reference character 64. Said worm and worm gear are of the self-locking type arranged to hold the turning frame 18 in the desired position until positively locked. A spur gear 65 is keyed on the inner end of the shaft 63 and is adapted to be selectively driven from the motor 13 by means of a novel arrangement of gearing which will hereinafter be more fully described as this specification proceeds.

The turning frame 18 is positively locked in fixed relation with respect to the cutting mechanism support frame 15 during the cutting operation by means of a toothed segment 66 adapted to engage the teeth of the spur gear 59. (See Figure 7.) Said segment is slidably guided in a member 67 secured to the enlarged forward end 17 and fitting in a rectangular slot formed in said enlarged forward end, and, as herein shown, said segment is on the left hand side of the end portion 17 when looking toward the forward end of the machine. A shank 69 extends outwardly from said toothed segment and is slidably guided in a drilled aperture formed in the member 67 and has an elongated eye 71 mounted in and extending from the outer end of said shank. Said eye is adapted to be engaged by an eccentric 72 on a longitudinally extending rock shaft 70 for moving said toothed segment into and out of engagement with the teeth of the spur gear 59 (see Figure 7) upon rocking movement of said shaft in an obvious manner.

Referring now particularly to the mechanism for moving the support frame 19 toward or from the turning frame 18 in parallel relation with respect thereto and equalizing the loads between said frames, said support frame is provided with a pair of parallel-spaced guides 76, 76 extending from the rearward end thereof which register for engagement with parallel-spaced guides 77, 77 extending from the turning frame 18 immediately forwardly of the annular shouldered portion 55. Said adjusting mechanism includes a novel arrangement of parallel link mechanism disposed forwardly of the guides 77, 77 and having engagement with opposite sides of the forward and rearward ends of said support frame which includes a pair of bell crank members 78, 78 pivotally mounted on opposite sides of the forward end of the turning frame 18 on a transversely extending shaft 79, and a pair of bell crank members 80, 80 mounted adjacent the rearward end of said turning frame on the outer sides thereof and forwardly of the guides 77, 77 on aligned oppositely extending transversely disposed stud shafts 81, 81. The bell crank members 78, 78 and 80, 80 are connected together to operate as a unit by means of parallel links 82, 82 pivotally connected to lever arms 84, 84 and 85, 85 of respective of said bell crank members. Thus, all of said bell crank members may rock together as a unit in parallel relation with respect to each other upon rocking movement of the shaft 79.

A second lever arm 87 of each bell crank member 78 is pivotally connected to the forward end of the supporting frame 19 by means of a link 88 extending downwardly therefrom. In a like manner, a second lever arm 91 of each bell crank member 80 is pivotally connected with a rearward portion of the supporting frame 19 by means of a link 92 which depends from said lever arm in parallel relation with respect to the link 88.

The transversely extending shaft 79 is rocked to move the supporting frame 19 in parallel relation with respect to the turning frame 18 by means of a crank arm 93 secured to said shaft and herein shown as extending upwardly and angularly rearwardly therefrom, when the parts are in the position shown in Figures 3, 4 and 8. Said crank arm has a pair of parallel-spaced rearwardly extending links 95, 95 pivotally connected to opposite sides thereof on the ends of a pin 94. The rearward ends of said links are pivotally connected to stud shafts or pivotal pins 96, 96 extending outwardly from opposite sides of a nut 97. Said nut is threaded on a threaded shaft 98 which is journaled at its rearward end in a guide frame 99 on suitable ball bearings 100, 100. Said shaft extends forwardly along a guide 101 formed in said guide frame, between the upper and lower sides of said guide and said nut is guided for movement along said guide. (See Figures 4, 8 and 11.) Said guide frame is mounted on and extends upwardly from the bottom of the turning frame 18.

Suitable means are provided on the threaded shaft 98 for engaging the nut 97 at the extreme ends of its path of travel along said shaft which as herein shown comprise a stop 105 mounted adjacent the forward end of the front ball bearing 100 and a stop 106 at the forward end of said shaft. Said stops are adapted to engage suitable jaws 108, 108 extending forwardly and rearwardly from the nut 97.

A spur gear 103 is secured to the rearward end of the threaded shaft 98 for driving said shaft. Said spur gear is meshed with a spur gear 109 freely mounted on the forward end of a longitudinally extending shaft 110. Said last-mentioned shaft is driven by a spur gear 111 on the rearward end thereof, which is selectively connectible with the forward end of the motor 13, so that it may be driven therefrom in reverse directions without reversal of said motor independently of movement of the other parts of the machine. A suitable slip clutch 113 of the pin type, loaded by means of a spring 114 in a usual manner is provided to connect the gear 109 with the shaft 110. Said clutch is of a construction well known to those skilled in the art and is arranged to slip upon a predetermined load on the shaft 110 to prevent breakage of the parts, and is not herein described in detail since it is no portion of my present invention.

Thus, a simplified arrangement of links and levers has been provided for equalizing loads between the forward and rearward ends of the support frame 19 and preventing binding between the guides 76, 76 and 77, 77, which mechanism also moves the cutter bar toward or from the turning frame 18 in parallel relation with respect thereto, and is confined substantially within the limits of the turning frame 18 when the parts are in a retracted position.

Referring now to Figure 3 in particular and the pivotal support for the cutter bar 16, which permits said bar to be swung at either a high positioning or low feeding speed about an axis disposed adjacent its rearward end and perpendicular to the axis of the turning frame 18, the cutter frame 20 is mounted in the support frame 19 on an annular shouldered bearing member 117. A ring gear 118 having an annular flange 119 extending inwardly therefrom is secured to the upper side of the cutter frame 20 by means of suitable cap screws extending through said annular flange and threaded within said cutter frame. Said annular flange extends over the bearing member 117 and said ring gear extends downwardly from the upper surface of said cutter frame in a pocket formed in said support frame.

The spur ring gear 118 is meshed with a spur pinion 120 journaled in the forward end of the support frame 19, which pinion is driven from a hub 124 of a worm gear 125, journaled in the turning frame 18 adjacent the forward end thereof, by means of an extensible drive connection which includes a splined shaft 121 engaging an internally splined hub of said spur pinion. Said splined shaft in turn slidably engages an internally splined sleeve 122 which is also externally splined and is slidably mounted within an internally splined portion of the hub 124 of the worm gear 125. Said worm gear is journaled on its hub in the turning frame 18 adjacent the forward end thereof in a suitable manner. (See Figure 3.) Suitable means are provided to limit downward movement of said splined shaft and splined sleeve with respect to each other when the turning frame 18 is in a normal or inverted position which means are not herein described, since they are no part of my present invention.

The worm gear 125 meshes with and is driven from a worm 130 on the forward end of a longitudinally extending shaft 132. Said worm and worm gear are of a usual self-locking type for holding said cutter bar in fixed relationship with respect to the support frame 19 when desired. The shaft 132 is journaled in the turning frame 18 and has a spur pinion 133 secured to its rearward end which may be selectively driven from the forward end of the motor 13 in reverse directions without reversal of said motor at either a high or low frictionally controlled speed in a manner which will hereinafter more clearly appear as this specification proceeds.

The drive connections from the forward end of the motor 13 for elevating said cutting element with respect to said truck, turning said turning frame about an axis extending longitudinally of the machine, moving the cutter bar toward or from said turning frame, and swinging the cutter bar at either a high positioning speed or low feeding speed, include a transversely extending shaft 134 journaled in the frame 15 and driven from the motor 13 through reverse gearing which includes oppositely disposed bevel gears 135, 135 freely mounted on said shaft. Mechanisms driven from one end of said shaft serve to elevate the cutting element with respect to its supporting truck and selectively turn the turning frame 18, and mechanisms driven from the other end of said shaft serve to adjust the cutter bar with respect to the turning frame and swing the cutter bar about an axis perpendicular to the axis of said turning frame.

The bevel gears 135, 135 are meshed with a bevel gear 136 on the forward end of a longitudinal shaft 137. Said longitudinal shaft is journaled in the cutting mechanism support frame 15 and is driven from a spur gear 139 which is meshed with the motor pinion 33.

Suitable friction clutches 143, 143, of a usual construction and not herein shown or described in detail since they are no portion of my present invention, are provided for connecting either of the bevel gears 135, 135 with the shaft 134 for driving said shaft. Said clutches are engaged with their associated bevel gears by means of a clutch collar 144 in a usual manner not herein shown or described since it is no portion of my present invention.

The drive connection from the shaft 134 for either elevating the cutting element with respect to the truck frame or turning the turning frame about an axis extending longitudinally of the machine includes a spur gear 160 feathered on the shaft 134 and adapted to selectively engage either a spur gear 162 freely mounted on the transversely extending shaft 54 or the spur gear 65 keyed on the inner end of the transverse shaft 63.

The spur gear 160 is operatively connected with the shaft 54 for driving said shaft, by means of a suitable friction slip clutch 163 which is arranged to slip upon a predetermined load on said shaft. (See Figures 4 and 5.) Said slip clutch is of an ordinary construction well known to those skilled in the art and is no portion of my present invention, so will not herein be described in detail, and is loaded by means of a spring 164 encircling said shaft and interposed between a collar 165 threaded on said shaft and a drive member 167 feathered on said shaft. (See Figure 5.) Said spur gear is shifted along the shaft 134 to mesh with either the spur gear 162 or 65 by means of a suitable system of levers not herein shown or described since it is no portion of my present invention and is described in my aforementioned application of which this is a division. Suitable means (not shown) are provided for locking the spur gear 160 in mesh with either the spur gear 162 or the spur gear 65.

The end of the transversely extending shaft 134 opposite the spur gear 160 is provided with a worm 180 which forms a drive member for the mechanism for moving the cutter bar with respect to the turning frame 18 in a plurality of parallel planes and swinging the cutter bar at either a high positioning or low feeding speed. Said worm meshes with a worm gear 181 keyed on a longitudinally extending sleeve 182 journaled in the frame 15. (See Figure 6.) Said sleeve extends within a planetary gear reduction mechanism 183, and as herein shown, has a pinion 184 cut integral therewith which serves as a sun gear for said planetary. Said sun gear meshes with and drives planetary pinions 185, 185 freely mounted on shafts 186, 186 mounted at their ends in a cage 187. Said planetary pinions mesh with an internal gear 188, herein shown as being formed integral with a spider 179 journaled on its hub within a support bracket 192. Planetary pinions 189, 189 are spaced from and are herein shown as being formed integral with the planetary pinions 185, 185. Said planetary pinions mesh with an internal gear 190 carried on a flanged spider 191 which is keyed on a longitudinally extending shaft 193.

A flange 194 of the cage 187 extends along the outer periphery of the internal gear 190. Said flange is adapted to be engaged by a friction band 195. The outer periphery of the internal gear 188 is likewise adapted to be engaged by a friction band 196. The friction bands 195 and 196 are engaged with or disengaged from the flange 194 and outer periphery of the internal gear 188, respectively, in a suitable manner which is no portion of my present invention, so will not herein be described in detail. Said mechanism is so arranged that when one of said friction bands is in an engaged position, the other will be in a disengaged position and vice versa.

When the cage 187 is held from rotation by the friction band 195, the internal gear 190 will be driven through the sun gear 184, planetary pinions 185, 185, and planetary pinions 189, 189 meshing with said internal gear, which will rotate the shaft 193 at a relatively high rate of speed. When the internal gear 188 is held from rotation by the friction band 196, and the cage 187 is free to rotate, the internal gear 190 will be driven through the sun gear 184 and planetary pinions 185 and 189 moving in an orbital path about the internal gear 188. This will drive the shaft 193 at a relatively low feeding speed.

A spur gear 199 is keyed on the outer end of the shaft 193 which meshes with and drives an idler gear 200. The faces of the teeth of said idler gear are relatively long and said idler gear is adapted to mesh with a spur gear 201 feathered on a sleeve 202 for movement therealong. Said sleeve is journaled on the longitudinally extending shaft 29 which is disposed coaxial with the turning axis of the turning frame 18. A spur gear 204 is keyed on the hub of the spur gear 201. The spur gear 201 is shifted along the sleeve 202 by means of a suitable system of links and levers, in the manner shown in my aforementioned parent application of which this is a division, to mesh the spur gear 204 with either the spur pinion 111 for moving the cutter bar toward or from the turning frame 18, or the spur pinion 133 for swinging the cutter bar at either a frictionally controlled high positioning or low feeding speed. (See Figure 4.)

It may thus be seen that a simplified and compact drive has been provided from the forward end of the motor which consists of a reversely driven transversely disposed shaft, one end of which serves to selectively raise or lower the cutting element with respect to its supporting truck or turn the cutter bar about an axis extending longitudinally of the machine, and the other end of which serves to move the cutter bar towards and from the longitudinal axis of the machine or swing the cutter bar at either a high positioning or a low feeding speed, and that this connection includes a shiftable gear coaxial with the longitudinal axis of the machine.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a mining machine, a mobile truck, a cutting element on said truck, said cutting element including a motor, a frame projecting therefrom, a support frame mounted for movement towards and from said frame, a projecting chain carrying cutter bar supported by said support frame for pivotal movement with respect thereto about an axis disposed perpendicular to the orbital path of said cutter chain, and means driven from the forward end of said motor for moving said cutter bar and support frame towards and from said first mentioned frame including a shaft extending longitudinally of the machine, a selective drive connection between said motor and shaft, a linkage connection between said frames, and means extensible along said shaft and moved therealong upon rotation thereof, said extensible means having operative connection with said linkage connection for moving said support frame towards and from said first mentioned frame.

2. In a mining machine, a mobile truck, a cutting element on said truck, said cutting element including a motor, a frame projecting therefrom, a support frame mounted for movement towards and from said frame, a projecting chain carrying cutter bar supported by said support frame for pivotal movement with respect thereto about an axis disposed perpendicular to the orbital path of said cutter chain, and a drive connection from said motor for adjustably moving said cutter bar towards and from said frame including a threaded shaft extending longitudinally of the machine, a linkage connection between said frames, a selective drive connection between said motor and threaded shaft for rotatably driving said shaft, and a member having operative connection with said linkage connection and threaded on said shaft and guided for extensible movement therealong.

3. In a mining machine, a mobile truck, a cutting element on said truck, said cutting element including a motor, a frame projecting therefrom, a support frame mounted for movement towards and from said frame, a projecting chain carrying cutter bar supported by said support frame for pivotal movement with respect thereto about an axis disposed perpendicular to the orbital path of said cutter chain, and means driven from the forward end of said motor for moving said cutter bar and support frame towards and from said first mentioned frame including a transverse shaft mounted in said frame, a drive connection from said motor to said shaft, another shaft disposed forwardly of said transverse shaft adjacent one side of the machine and extending longitudinally thereof, a selective drive connection between said shafts, a linkage connection between said frames, and means guided for extensible movement along said last mentioned shaft, and being moved therealong upon rotation of said shaft, said means being operatively connected with said linkage connection for moving said support frame towards and from said first mentioned frame upon movement of said extensible means along said shaft.

4. In a mining machine, a mobile truck, a cutting element on said truck, said cutting element including a motor, a frame projecting therefrom, a support frame mounted for movement towards and from said frame, a projecting chain carrying cutter bar supported by said support frame for pivotal movement with respect thereto about an axis disposed perpendicularly to and within the orbital path of said cutter chain, means driven by said motor for moving said cutter bar and support frame towards and from said first mentioned frame and swinging said cutter bar about its axis of pivotal connection to said support frame including a shaft mounted in said frame, a drive connection from said motor to said shaft, another shaft extending longitudinally of the machine and disposed adjacent one side thereof, another shaft extending longitudinally of the machine adjacent the opposite side thereof from said last mentioned shaft, selective drive connections between said first mentioned shaft and said other shafts, a drive connection from said second mentioned shaft for swinging said cutter bar, and means extensibly moved along said second mentioned longitudinal shaft upon rotation thereof and having operative connection with said support frame for adjustably moving said support frame and cutter bar towards and from said first mentioned frame.

5. In a mining machine, a mobile truck, a cutting element on said truck, said cutting element including a motor, a frame projecting therefrom, a support frame mounted for movement towards and from said frame, a projecting chain carrying cutter bar supported by said support frame for pivotal movement with respect thereto about an axis disposed perpendicularly to and within the orbital path of said cutter chain, means driven by said motor for moving said cutter bar and support frame towards and from said first mentioned frame and swinging said cutter bar about its axis of pivotal connection to said support frame including a shaft mounted in said frame, a shiftable gear driven thereby, a shaft disposed to one side of said gear and extending longitudinally of the machine, another shaft extending longitudinally of the machine and disposed to the opposite side of said gear, selective drive connections between said gear and last mentioned shafts, a drive connection between one of said shafts and cutter bar for swinging said cutter bar, and means extensible along said other shaft upon rotation thereof for moving said cutter bar towards or from said frame.

6. In a mining machine, a mobile truck, a cutting element on said truck, said cutting element including a motor, a frame projecting therefrom, a support frame mounted for movement towards and from said frame, a projecting chain carrying cutter bar supported by said support frame for pivotal movement with respect thereto about an axis disposed perpendicular to the orbital path of said cutter chain, and means driven by said motor for moving said cutter bar and support frame towards and from said first mentioned frame and swinging said cutter bar about its axis of pivotal connection to said support frame including a shaft mounted in said frame, and extending transversely thereof, a drive connection from said motor to said shaft, a shiftable gear rotatable about an axis extending longitudinally of the machine, a drive connection from said transverse shaft to said gear, a shaft extending longitudinally of the machine and disposed adjacent one side thereof, another shaft extending longitudinally of the machine adjacent the opposite side thereof, selective drive connections between said gear and shafts, means driven from said first mentioned shaft for swinging said cutter bar at a feeding speed, and means extensible along said other shaft upon rotation thereof and having connection with said cutter bar for moving said cutter bar towards and from said frame.

7. In a mining machine, a mobile truck, a cutting element mounted for vertical movement with respect to said truck, said cutting element including a motor, and a projecting cutter chain carrying cutter bar disposed forwardly of said motor and mounted for movement about an axis extending longitudinally of the machine, about an axis perpendicular to said longitudinal axis and disposed forwardly of said truck, and towards and from said longitudinal axis, and means driven by said motor for selectively moving said cutting element vertically with respect to said truck and adjustably moving said cutter bar about said longitudinal axis, and also moving said cutter bar towards and from said longitudinal axis and about said perpendicular axis at a feeding speed comprising a transversely disposed shaft driven by said motor and disposed forwardly thereof, drive connections from one end of said shaft for selectively moving said cutting element towards and from said truck and turning said cutter bar about said longitudinal axis, and drive connections from the other end of said shaft for moving said cutter bar towards and from said longitudinal axis, and independently swinging said cutter bar about said perpendicular axis at a feeding speed.

8. In a mining machine, a mobile truck, a cutting element mounted for vertical movement with respect to said truck, said cutting element including a motor, and a projecting cutter chain carrying cutter bar disposed forwardly of said motor and mounted for movement about an axis extending longitudinally of the machine, about an axis perpendicular to said longitudinal axis and disposed forwardly of said truck, and towards and from said longitudinal axis, and means driven by said motor for selectively moving said cutting element vertically with respect to said truck and moving said cutter bar about said longitudinal axis, and also moving said cutter bar towards and from said longitudinal axis and about said perpendicular axis at a feeding speed comprising a transversely disposed shaft driven by said motor and disposed forwardly thereof, drive connections from one end of said shaft for selectively moving said cutting element towards and from said truck and turning said cutter bar about said longitudinal axis, and drive connections from the other end of said shaft for selectively moving said cutter bar towards and from said longitudinal axis, and independently swinging said cutter bar at a feeding speed including a gear driven by said transverse shaft and disposed coaxial with the longitudinal axis of the machine and mounted for shiftable movement therealong for engagement with drive means for moving said cutter bar towards and from said longitudinal axis when shiftably moved in one direction, and for engagement with drive means for swinging said cutter bar about an axis perpendicular to said longitudinal axis when shiftably moved in an opposite direction.

9. In a mining machine, a mobile truck, a cutting element mounted for vertical movement with respect to said truck, said cutting element including a motor, and a projecting cutter chain carrying cutter bar disposed forwardly of said motor and mounted for movement about an axis extending longitudinally of the machine, about an axis perpendicular to said longitudinal axis, and towards and from said longitudinal axis, and means driven by said motor for selectively moving said cutting element vertically with respect to said truck and moving said cutter bar about said longitudinal axis, and towards and from said longitudinal axis comprising a transversely disposed shaft driven by said motor and disposed forwardly thereof, drive connections from one end of said shaft for selectively moving said cutting element towards and from said truck and adjustably turning said cutter bar about said longitudinal axis, a gear coaxial with the longitudinal axis of the machine and mounted for shiftable movement therealong, a gear arranged on one side of said shiftable gear and forming a drive member for moving said cutter bar towards and from said longitudinal axis and adapted to be selectively meshed with said shiftable gear, a gear arranged on the opposite side of said shiftable gear and forming a drive member for swinging said cutter bar about said perpendicular axis at a feeding speed and adapted to be selectively meshed with said shiftable gear, and a selective drive connection from the opposite end of said shaft to said shiftable gear.

10. In a mining machine, a mobile truck, a cutting element mounted for vertical movement with respect to said truck, said cutting element including a motor, and a projecting cutter chain carrying cutter bar disposed forwardly of said motor and mounted for movement about an axis extending longitudinally of the machine, about an axis perpendicular to said longitudinal axis, and towards and from said longitudinal axis, and means driven by said motor for selectively moving said cutting element vertically with respect to said truck and moving said cutter bar about said longitudinal axis, and towards and from said longitudinal axis comprising a transversely disposed shaft driven by said motor and disposed forwardly thereof, drive connections from one end of said shaft for selectively moving said cutting element towards and from said truck and adjustably turning said cutter bar about said longitudinal axis, a gear coaxial with the longitudinal axis of the machine and mounted for shiftable movement therealong, a gear arranged on one side of said shiftable gear and forming a drive member for moving said cutter bar towards and from said longitudinal axis and adapted to be selectively meshed with said shiftable gear, a gear arranged on the opposite side of said shiftable gear and forming a drive member for swinging said cutter bar about said perpendicular axis at a feeding speed and adapted to be selectively meshed with said shiftable gear, and a selective drive connection from the opposite end of said shaft to said shiftable gear including a planetary geared reduction device rotatable about an axis disposed longitudinally of the machine.

11. In a mining machine, a mobile truck, a cutting element mounted on said truck for vertical movement with respect thereto, said cutting element including a motor, a frame projecting forwardly therefrom, a turning frame mounted on the forward end of said frame for turning movement about an axis extending longitudinally of the machine, a projecting chain carrying cutter bar adjustably mounted for movement towards and from said turning frame and for feeding movement about an axis disposed within the orbit of said cutter chain and perpendicular to the longitudinal axis of the machine, and reverse drive connections from said motor for moving said cutting element vertically with respect to said truck and moving said turning frame about said longitudinal axis, and also moving said cutter bar towards and from said turning frame and about said perpendicular axis at a feeding speed comprising a transversely disposed shaft mounted in said first mentioned frame, a reverse drive connection from said motor to said shaft, drive connections from one end of said shaft for selectively moving said cutting element towards and from said truck and turning said turning frame about said longitudinal axis, and drive connections from the other end of said shaft for moving said cutter bar towards and from said turning frame and independently swinging said cutter bar about said perpendicular axis at a feeding speed.

12. In a mining machine, a mobile truck, a cutting element mounted on said truck for vertical movement with respect thereto, said cutting element including a motor, a frame projecting forwardly therefrom, a turning frame mounted on the forward end of said frame for turning movement about an axis extending longitudinally of the machine, a projecting chain carrying cutter bar adjustably mounted for movement towards and from said turning frame and for feeding movement about an axis disposed within the orbit of said cutter chain and perpendicular to the longitudinal axis of the machine, and reverse drive connections from said motor for moving said cutting element vertically with respect to said truck and moving said turning frame about said longitudinal axis, and also moving said cutter bar towards and from said turning frame and about said perpendicular axis at a feeding speed comprising a transversely disposed shaft mounted in said first mentioned frame, a reverse drive connection from said motor to said shaft, drive connections from one end of said shaft for selectively moving said cutting element towards and from said truck and turning said turning frame about said longitudinal axis, and drive connections from the other end of said shaft for moving said cutter bar towards and from said turning frame and independently swinging said cutter bar about said perpendicular axis at a feeding speed including a gear mounted in said first mentioned frame coaxial with the longitudinal axis of the machine and mounted for shiftable movement therealong, a gear mounted on said turning frame to one side of said shiftable gear and forming a drive member for moving said cutter bar towards and from said longitudinal axis and adapted to be selectively meshed with said shiftable gear, and another gear arranged on the opposite side of said shiftable gear and forming a drive member for swinging said cutter bar about said perpendicular axis at a feeding speed and adapted to be selectively meshed with said shiftable gear.

13. In a mining machine, a mobile truck, a cutting element mounted on said truck for vertical movement with respect thereto, said cutting element including a motor, a frame projecting forwardly therefrom, a turning frame mounted on the forward end of said frame for turning movement about an axis extending longitudinally of the machine, a projecting chain carrying cutter bar adjustably mounted for movement towards and from said turning frame and for feeding movement about an axis disposed within the orbit of said cutter chain and perpendicular to the longitudinal axis of the machine, and reverse drive connections from said motor for moving said cutting element vertically with respect to said truck and moving said turning frame about said longitudinal axis, and also moving said cutter bar towards and from said turning frame and about said perpendicular axis at a feeding speed comprising a transversely disposed shaft mounted in said first mentioned frame, a reverse drive connection from said motor to said shaft, drive connections from one end of said shaft for selectively moving said cutting element towards and from said truck and turning said turning frame about said longitudinal axis, a gear mounted in said first mentioned frame coaxial with the longitudinal axis of the machine and mounted for shiftable movement therealong, a gear mounted on said turning frame to one side of said shiftable gear and forming a drive member for moving said cutter bar towards and from said longitudinal axis and adapted to be selectively meshed with said shiftable gear, another gear arranged on the opposite side of said shiftable gear and forming a drive member for swinging said cutter bar about said perpendicular axis at a feeding speed and adapted to be selectively meshed with said shiftable gear, and a selective drive connection from the opposite end of said shaft to said shiftable gear.

14. In a mining machine, a mobile truck, a cutting element mounted on said truck for vertical movement with respect thereto, said cutting element including a motor, a frame projecting forwardly therefrom, a turning frame mounted on the forward end of said frame for turning movement about an axis extending longitudinally of the machine, a projecting chain carrying cutter bar adjustably mounted for movement towards and from said turning frame and for feeding movement about an axis disposed within the orbit of said cutter chain and perpendicular to the longitudinal axis of the machine, and reverse drive connections from said motor for moving said cutting element vertically with respect to said truck and moving said turning frame about said longitudinal axis, and also moving said cutter bar towards and from said turning frame and about said perpendicular axis at a feeding speed comprising a transversely disposed shaft mounted in said first mentioned frame, a reverse drive connection from said motor to said shaft, drive connections from one end of said shaft for selectively moving said cutting element towards and from said truck and turning said turning frame about said longitudinal axis, a gear mounted in said first mentioned frame coaxial with the longitudinal axis of the machine and mounted for shiftable movement therealong, a gear mounted on said turning frame to one side of said shiftable gear and forming a drive member for moving said cutter bar towards and from said longitudinal axis and adapted to be selectively meshed with said shiftable gear, another gear arranged on the opposite side of said shiftable gear and forming a drive member for swinging said cutter bar about said perpendicular axis at a feeding speed and adapted to be selectively meshed with said shiftable gear, and a selective drive connection from the opposite end of said shaft to said shiftable gear including a planetary geared reduction device rotatable about an axis disposed longitudinally of the machine.

15. In a track mounted mining machine, a truck, a cutting element mounted on said truck, said cutting element including a motor, a frame projecting forwardly therefrom, a turning frame mounted for pivotal movement with respect to said frame about an axis extending longitudinally of the machine, a support frame mounted for movement towards and from said turning frame, a projecting chain carrying cutter bar supported by said support frame for pivotal movement with respect thereto about an axis perpendicular to the pivotal axis of said turning frame, and means driven by said motor for independently moving said frames in various positions of adjustment with respect to each other comprising a shaft mounted in said first mentioned frame and extending transversely thereof, a drive connection from one end of said shaft for turning said turning frame, and drive connections from the other end of said shaft for moving said cutter bar towards and from said turning frame when said turning frame is in various angular relationships with respect to said first mentioned frame, and independently swinging said cutter bar at a feeding speed.

16. In a track mounted mining machine, a truck, a cutting element mounted on said truck, said cutting element including a motor, a frame projecting forwardly therefrom, a turning frame mounted for pivotal movement with respect to said frame about an axis extending longitudinally of the machine, a support frame mounted for movement towards and from said turning frame, a projecting chain carrying cutter bar supported by said support frame for pivotal movement with respect thereto about an axis perpendicular to the pivotal axis of said turning frame, and means driven by said motor for independently moving said turning and support frames and cutter bar when said turning frame is in various positions of adjustment with respect to said first mentioned frame comprising a shaft mounted in said first mentioned frame and extending transversely thereof, and a drive connection from said motor to said shaft, a selective drive connection from one end of said shaft for turning said turning frame, selective drive connections from the other end of said shaft for moving said cutter bar towards and from said turning frame and for swinging said cutter bar at a feeding speed including a gear driven from said shaft and disposed coaxial with the turning axis of said turning frame, a shaft extending longitudinally of the machine having means extensible therealong, a drive connection from said gear to said shaft, and an operative connection from said extensible means to said support frame, another gear coaxial with the pivotal axis of said cutter bar, and a drive connection from said gear coaxial with the axis of said turning frame to said last named gear.

17. In a track mounted mining machine, a truck, a cutting element mounted on said truck, said cutting element including a motor, a frame projecting forwardly therefrom, a turning frame mounted for pivotal movement with respect to said frame about an axis extending longitudinally of the machine, a support frame mounted for movement towards and away from said turning frame, a projecting cutter bar mounted in said support frame for pivotal movement with respect thereto about an axis perpendicular to the pivotal axis of said turning frame, and means driven by said motor for independently moving said turning and support frames and cutter bar when said turning frame is in various positions of adjustment with respect to said first mentioned frame comprising a shaft mounted in said first mentioned frame and extending transversely thereof and a drive connection from said motor to said shaft, a selective drive connection from one end of said shaft for turning said turning frame, a selective drive connection from the other end of said shaft for swinging said cutter bar at a feeding speed, and another selective drive connection from said last mentioned end of said shaft for moving said cutter bar towards and from said turning frame comprising a threaded shaft extending longitudinally of said turning frame and disposed forwardly of said transversely extending shaft.

18. In a track mounted mining machine, a truck, a cutting element mounted on said truck for vertical movement with respect thereto, said cutting element including a motor, a frame projecting forwardly therefrom, a turning frame mounted for pivotal movement with respect to said frame about an axis extending longitudinally of the machine, a support frame mounted for movement towards and away from said turning frame, a projecting cutter bar mounted in said support frame for pivotal movement with respect thereto about an axis perpendicular to the pivotal axis of said turning frame, a cutter chain movable about said cutter bar, a drive connection from said motor to said cutter chain including a shaft coaxial with the turning axis of said turning frame, another drive connection from said motor for independently moving said turning and support frames and cutter bar when said turning frame is in various positions of adjustment with respect to said first mentioned frame comprising a shaft mounted in said first mentioned frame and extending transversely thereof and a drive connection from said motor to said shaft, selective drive connections from one end of said shaft for elevating said cutting element with respect to said truck or independently turning said turning frame, and selective drive connections from the other end of said shaft for swinging said cutter bar at a feeding speed or moving said cutter bar towards and from said turning frame including a gear coaxial with and shiftable translationally of the shaft which drives said cutter chain about said cutter bar, another gear adapted to be meshed with said gear, a gear coaxial with the pivotal axis of said cutter bar driven by said last mentioned gear, a threaded shaft extending longitudinally of said turning frame, a connection between said shaft and support frame for moving said support frame towards and from said turning frame, and a gear for rotating said threaded shaft adapted to be selectively meshed with said gear which is coaxial with and movable along the shaft for driving said cutter chain about said cutter bar.

19. In a track mounted mining machine, a truck, a cutting element mounted on said truck for vertical movement with respect thereto, said cutting element including a motor, a frame projecting forwardly therefrom, a turning frame mounted for pivotal movement with respect to said frame about an axis extending longitudinally of the machine, a support frame mounted for movement towards and away from said turning frame, a projecting cutter bar mounted in said support frame for pivotal movement with respect thereto about an axis perpendicular to the pivotal axis of said turning frame, a cutter chain movable about said cutter bar, a drive connection from said motor to said cutter chain including a shaft coaxial with the turning axis of said turning frame, another drive connection from said motor for independently moving said turning and support frames and cutter bar when said turning frame is in various positions of adjustment with respect to said first mentioned frame comprising a shaft mounted in said first mentioned frame and extending transversely thereof and a drive connection from said motor to said shaft, selective drive connections from one end of said shaft for elevating said cutting element with respect to said truck or independently turning said turning frame, and selective drive connections from the other end of said shaft for swinging said cutter bar at a feeding speed or moving said cutter bar towards and from said turning frame including a shaft disposed perpendicularly to said transverse shaft, plural speed frictionally controlled gear reduction means for driving said shaft from said transverse shaft at either a high or low frictionally controlled speed, a gear coaxial with and movable along the shaft which drives said cutter chain about said cutter bar, another gear adapted to be selectively meshed with said last mentioned gear, a gear coaxial with the pivotal axis of said cutter bar and driven from said last mentioned gear, a threaded shaft extending longitudinally of said turning frame on the opposite side thereof from the drive connections for turning said cutter bar, a connection between said shaft and support frame for moving said support frame towards and from said turning frame, and a gear for driving said threaded shaft adapted to be selectively meshed with said gear which is coaxial with and movable along the shaft for driving said cutter chain about said cutter bar.

WILLIAM W. SLOANE.